United States Patent
Hayat et al.

(10) Patent No.: US 9,430,842 B1
(45) Date of Patent: Aug. 30, 2016

(54) MATERIAL CLASSIFICATION FUSED WITH SPATIO-SPECTRAL EDGE DETECTION IN SPECTRAL IMAGERY

(71) Applicant: STC.UNM, Albuquerque, NM (US)

(72) Inventors: Majeed M. Hayat, Albuquerque, NM (US); Sanjay Krishna, Albuquerque, NM (US); Sebastian Eugenio Godoy, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 360 days.

(21) Appl. No.: 14/334,446

(22) Filed: Jul. 17, 2014

Related U.S. Application Data

(60) Provisional application No. 61/847,242, filed on Jul. 17, 2013.

(51) Int. Cl.
  *G06T 7/00* (2006.01)
  *G06K 9/62* (2006.01)
  *G06K 9/46* (2006.01)
  *G06T 7/40* (2006.01)

(52) U.S. Cl.
  CPC ........... *G06T 7/0085* (2013.01); *G06K 9/4638* (2013.01); *G06K 9/4652* (2013.01); *G06K 9/6268* (2013.01); *G06K 9/6289* (2013.01); *G06T 7/408* (2013.01); *G06T 2207/10036* (2013.01); *G06T 2207/10048* (2013.01); *G06T 2207/30184* (2013.01)

(58) Field of Classification Search
  None
  See application file for complete search history.

(56) References Cited

U.S. PATENT DOCUMENTS

| | | | |
|---|---|---|---|
| 7,751,639 B1* | 7/2010 | Finlayson | G06K 9/4647 345/690 |
| 8,649,607 B1 | 2/2014 | Hayat et al. | |
| 2008/0075371 A1* | 3/2008 | Dana | G06K 9/4661 382/199 |
| 2009/0245680 A1* | 10/2009 | Maxwell | G06T 7/0083 382/266 |
| 2011/0222742 A1* | 9/2011 | Stein | G06K 9/00221 382/118 |
| 2011/0309236 A1* | 12/2011 | Tian | H01L 27/14603 250/208.1 |
| 2012/0008021 A1* | 1/2012 | Zhang | G06K 9/00791 348/251 |
| 2013/0084006 A1* | 4/2013 | Zhang | G06T 7/0087 382/173 |
| 2015/0001087 A1* | 1/2015 | Dinneen | H01L 21/67253 205/81 |

OTHER PUBLICATIONS

Resmini, Ronald G. "Simultaneous spectral/spatial detection of edges for hyperspectral imagery: The HySPADE algorithm revisited." SPIE Defense, Security, and Sensing. International Society for Optics and Photonics, 2012.*

Stokman, Harro MG, and Theo Gevers. "Detection and Classification of Hyper-Spectral Edges." BMVC. 1999.*

(Continued)

*Primary Examiner* — Kim Vu
*Assistant Examiner* — Nathan Bloom
(74) *Attorney, Agent, or Firm* — Schwegman Lundberg & Woessner, P.A.

(57) ABSTRACT

Apparatus, systems, and methods fusing material classification with spatio-spectral edge detection in spectral imagery can be used in a variety of applications. In various embodiments, a classifier can be applied to neighboring pixels in data for an image to determine, based on material changes, if the neighboring pixels are correlated to two different materials with respect to a candidate location for an edge. Results of the classification can be used with a spatio-spectral mask to accept or reject the candidate location as an edge. Additional apparatus, systems, and methods are disclosed.

29 Claims, 7 Drawing Sheets

(56) References Cited

OTHER PUBLICATIONS

Paskaleva, Biliana Stefanova. Algorithms for spectral and spatio-spectral feature selection and classification for tunable sensors: theory and application. Diss. The University of New Mexico, May 2010.*

Paskaleva, B.S.; Hayat, M.M.; Woo-Yong Jang; Sharma, Y.D.; Bender, S.C.; Krishna, S., "Joint spatio-spectral based edge detection for multispectral infrared imagery," in Geoscience and Remote Sensing Symposium (IGARSS), 2010 IEEE International, vol., No., pp. 2198-2201, Jul. 25-30, 2010.*

"Colour Image Segmentation: A State-of-the-Art Survey", PINSA 67, A, No. 2, (Mar. 2001), 207-221.

Al-Suwailem, Umar A, et al., "Multichannel Image Identification and Restoration Using Continuous Spatial Domain Modeling", IEEE, International Conference on Image Processing, (1997), 466-469.

Andrews, Jonathan, et al., "Demonstration of a bias tunable quantum dots-in-a-well focal plane array", Infrared Physics & Technology, doi:10.1016/j.infrared.2009.05.018, (2009), 5 pgs.

Bao, Paul, et al., "Canny Edge Detection Enhancement by Scale Multiplication", IEEE Transactions on Pattern Analysis and Machine Intelligence 27(9), (Sep. 2005), 1485-1490.

Blomgren, Peter, et al., "Color TV: Total Variation Methods for Restoration of Vector-Value Images", IEEE Transactions on Image Processing 7(3), (Mar. 1998), 304-309.

Canny, John, "A computational approach to edge detection", IEEE Transactions on Pattern Analysis and Machine Intelligence, vol. PAMI-8, No. 6, (Nov. 1986), 679-698.

Cumani, Aldo, "Edge Detection in Multispectral Images", CVGIP: Graphical Models and Image Processing 53(1), (1991), 40-51.

Di Zenzo, Silvano, et al., "A Note on the Gradient of a Multi-Image", Computer Vision, Graphics, and Image Processing 33, (1986), 116-125.

Evans, Adrian N, et al., "A Morphological Gradient Approach to Color Edge Detection", IEEE Transactions on Image Porcessing 15(6), (Jun. 2006), 1454-1463.

Fohlfing, Torsten, et al., "Multi-classifier framework for atlas-based image segmentation", Pattern Recognition Letters 26, (2005), 2070-2079.

Gonzalez, Rafael C, et al., "", Digital Image Processing, Second Edition, Prentice Hall, (2002), 190 pgs.

Hartse, Hans E, et al., "A Preliminary Study of Regional Seismic Discrimination in Central Asia with Emphasis on Western China", Bulletin of the Seismological Society America 87(3), (Jun. 1997), 551-568.

Huete, A E, et al., "A Soil-Adjusted Vegetation Index (SAVI)", Remote Sensing of Environment 25, (1988), 295-399.

Jiang, Wei, et al., "Efficient Edge Detection Using Simplified Gabor Wavelets", IEEE Transactions on Systems, Man, and Cybernetics— Part II Cybernetics 29(4), (2009), 1036-1047.

Jordan, Johannes, et al., "Edge Detection in Multispectral Images Using the N-Dimensional Self-Organizing Map", 18th IEEE International Conference on Image Processing, (2011), 3181-3184.

Kaufman, Yoram J, et al., "Atmospherically Resistant Vegetation Index (ARVI) for EOS-MODIS", IEEE Transactions on Geoscience and Remote Sensing 30(2), (1992), 261-270.

Koschan, Andreas, et al., "Detection and Classification of Edges in Color Images", IEEE Signal Processing Magazine, (2005), 64-73.

Loog, Marco, et al., "Segmentation of the Posterior Ribs in Chest Radiographs Using Iterated Contextual Pixel Classification", IEEE Transactions on Medical Imaging 25(5), (May 2006), 602-611.

Lucey, P, et al., "Three years of operation of AHI: the University of Hawaii's Airborne Hyperspectral Imager", Infrared Technology and Applications XXVII, Proceedings of SPIE vol. 4369, (2001), 112-120.

Mayeda, Kevin, et al., "A new spectral ratio method using narrow band coda envelopes: Evidence for non-self-similarity in the Hector Mine sequence", Geophysical Research Letters 34, L11303, (2007), 5 pgs.

Mayeda, Kevin, et al., "Stable and Transportable Regional Magnitudes Based on Coda-Derived Moment-Rate Spectra", Bulletin of the Seismological Society of Amercia 93(1), (Feb. 2003), 224-239.

Miller, D. A. B, et al., "Band-Edge Electroabsorption in Quantum Well Structures: The Quantum-Confined Stark Effect", Physical Review Letters 53(22), (Nov. 1984), 2173-2176.

Mittal, Ajay, "Detection of Edges in Color Images: A Review and Evaluative Comparison of State-of-the-Art Techniques", AIS, LNCS 7326, (2012), 250-259.

Nezhadarya, Ehsan, et al., "A New Scheme for Robust Gradient Vector Estimation in Color Images", IEEE Transactions on Image Processing 20(8), (Aug. 2001), 2211-2220.

Paskaleva, Biliana, et al., "Model-based Edge Detector for Spectral Imagery Using Sparse Spatio-spectral Masks", IEEE Trans Image Process 23(5), (May 2014), 2315-27.

Paskaleva, Biliana, et al., "Multispectral Classification With Bias-Tunable Quantum Dots-in-a-Well Focal Plane Arrays", IEEE Sensors Journal 11(6), (Jun. 2011), 1342-1351.

Phillips, W. S, et al., "Application of Regional Phase Amplitude Tomography to Seismic Verification", Pure appl. geophys. 158, (2001), 1189-1206.

Resmini, Ronald G, "Hyperspectral/Spatial Detection of Edges (HySPADE): An Algorithm for Spatial and Spectral Analysis of Hyperspectral Information", Algorithms and Technologies for Multispectral, Hyperspectral and Ultraspectral Imagery X, Session 10—Multi-, Hyper-, and Ultraspectral Sensor Characterization and Calibration II, (Apr. 2004), 433-442.

Rivest, Jean-F, et al., "Morphological gradients", J. Electron. Imaging. 2(4), doi:10.1117/12.159642, (Oct. 1993), 326-336.

Sandberg, Berta, et al., "Logic Operators for Active Contours on Multi-Channel Images", UCLA Department of Mathematics CAM Report, [Online]. Retrieved from the Internet: <URL: ftp://ftp.math.ucla.edu/pub/camreport/cam02-12.ps.gz>, (2002), 1-26.

Sapiro, Cuillermo, et al., "Anisotropic Diffusion of Multivalued Images with Applications to Color Filtering", IEEE Transactions on Image Processing 5(11), (1996), 1582-1586.

Sapiro, Guillermo, "Color Snakes", Computer Vision and Image Understanding 68(2), (Nov. 1997), 247-253.

Soille, "9. Segmentation", Morphological Image Analysis: Principles and Applications, (2003), 267-290.

Toivanen, P J, et al., "Edge detection in multispectral images using the self-organizing map", Pattern Recognition Letters 24, (2003), 2987-2994.

Trahanias, P E, et al., "Color Edge Detection Using Vector Order Statistics", IEEE Transactions on Image Processing 2(2), (Apr. 1993), 259-264.

Weier, John, et al., "Measuring Vegetation (NDVI & EVI)", [Online]. Retrieved from the Internet: <URL: http://earthobservatory.nasa.com/Features/MeasuringVegetation/printall.php>, (Accessed Jul. 9, 2014), 6 pgs.

Xu, P, et al., "General method for edge detection based on the shear transform", IET Image Process 6(7), (2012), 839-853.

Yu, Ma, et al., "Feature fusion method for edge detection of color images", Journal of Systems Engineering and Electronics 20(2), (2009), 394-399.

* cited by examiner

MATERIAL CLASSIFICATION FUSED WITH SPATIO-SPECTRAL EDGE DETECTION IN SPECTRAL IMAGERY

RELATED APPLICATION

This application claims priority under 35 U.S.C. 119(e) from U.S. Provisional Application Ser. No. 61/847,242, filed 17 Jul. 2013, which application is incorporated herein by reference in its entirety.

GOVERNMENT INTEREST STATEMENT

This invention was made with Government support under Grant: National Consortium for MASINT Research 5746100107 and Grant: National Science Foundation (NSF) ECCS0925757. The United States Government has certain rights in the invention.

FIELD OF THE INVENTION

The invention relates generally to digital image processing and image analysis.

BACKGROUND

Image segmentation and edge detection for multispectral (MS) and hyperspectral (HS) images can be an inherently difficult problem since gray-scale images associated with individual spectral bands may reveal different edges. Segmentation algorithms for gray-scale images utilize basic properties of intensity values such as discontinuity and similarity. Popular gray-scale edge detectors include Canny, Sobel, and Prewitt detectors, to name just a few. The transition from a gray-scale to a multicolor image complicates edge detection significantly: the standard definition of a gray-scale edge as a "ramp" or "ridge" between two regions is no longer appropriate because a multicolor image has multiple image planes (channels) corresponding to different spectral bands. Moreover, depending on the composition of the scene, two distinct spectral (color) regions may exhibit the same intensity for one or more bands and, in this case, the edge between the two regions is termed isoluminant. An isoluminant edge is therefore characterized by a jump in color rather than a jump in intensity. As a result, a standard gradient-based operator cannot detect isoluminant edges easily because they usually do not exhibit an intensity ramp that can be estimated by the magnitude of such an operator.

The extension of gray-scale edge detection to multicolor images has followed three principal paths. A straightforward approach is to apply differential operators, such as the gradient, separately to each image plane (e.g., to each color slice of the three dimensional MS or HS image) and then consolidate the information to obtain edge information. Several key drawbacks of such a straightforward approach have been identified. First, while the combinations of different image planes can generally define edges, these edges may be missing in some of the image planes. Second, processing image planes separately disregards potential correlation across image planes. Third, integration of information from separate image planes is not trivial and is often done in an ad hoc manner. Moreover, in cases when an edge appears only in a subset of image planes, there are no standard, principle-based approaches to fuse the information from different planes. In recent years, new gray-scale algorithms were presented in the community but they all suffer from the scalability problem when applied to multicolor images.

A second approach for multicolor edge detection is to embed the variations of all color channels in a single measure, which is then used to obtain the edge maps. Typically, this approach is developed by starting from a given gray-scale operator, which is then consistently extended to multicolor images. Two representative examples of this approach are the multicolor gradient (MCG), and the morphological color gradient (MoCG). The MCG operator represents a consistent extension of the standard gradient operator to multicolor images and it measures the local steepness of the multicolor image considered as a manifold embedded in the Euclidean space. A hyper-pixel belongs to a multicolor edge if the local steepness of the manifold, as measured by MCG, exceeds a given threshold. Similarly, the MoCG operator is a consistent extension of the morphological gray-scale gradient operator to multicolor images. Such an operator is defined as the difference of the dilation and the erosion operators applied to a given structuring element. Because the MCG and the MoCG edge detectors simultaneously utilize spatial and spectral information, they are examples of joint spatio-spectral image-processing algorithms. The MCG algorithm and its related algorithms have been used with great success in digital image processing. However, for spectral images with a large number of bands, the number of mathematical operations required by the MCG algorithm can be prohibitively high, making the MCG algorithm not suitable for some big-data applications.

Another approach that falls into the category of joint spatio-spectral algorithms is the order-statistics approach and its extensions. In general, these algorithms consider the data as a discrete vector field and they utilize an R-ordering method to define a color edge detector using the magnitudes of linear combinations of the sorted vectors. Another algorithm in this category performs a mapping of the color image into a feature space, which considers features such as the local contrast, the edge connectivity, the color contrast similarity, and the orientation consistence. These features are merged together to create a single feature that is compared to a threshold to generate the final edge map. Similar approaches and more sophisticated estimators of the color gradient can be found in the literature on such processing.

A third approach for multicolor edge detection is to aim the algorithm to detect solely the changes between the materials present in the imaged scene. For example, the Hyperspectral/Spatial Detection of Edges (HySPADE) algorithm transforms the data cube into a spectral angle (SA) cube by calculating the SA between each hyperpixel in the cube with every other pixel. As a result, the third dimension in the original cube is replaced by the SA results, where jumps in the SA represent changes in the materials. The positions of these jumps are mapped back in to the original data cube, and the final edge map is derived upon statistical accumulation of edge information contained in every SA-cube. One important distinction between the MCG algorithm and the HySPADE algorithm is that the former utilizes both spectral and spatial information to detect the edges, while the HySPADE utilizes solely spectral information to unveil the boundaries of the material composition.

BRIEF DESCRIPTION OF THE DRAWINGS

Embodiments of the invention are illustrated by way of example and not limitation in the figures of the accompanying drawings in which.

DETAILED DESCRIPTION

Figure 1:
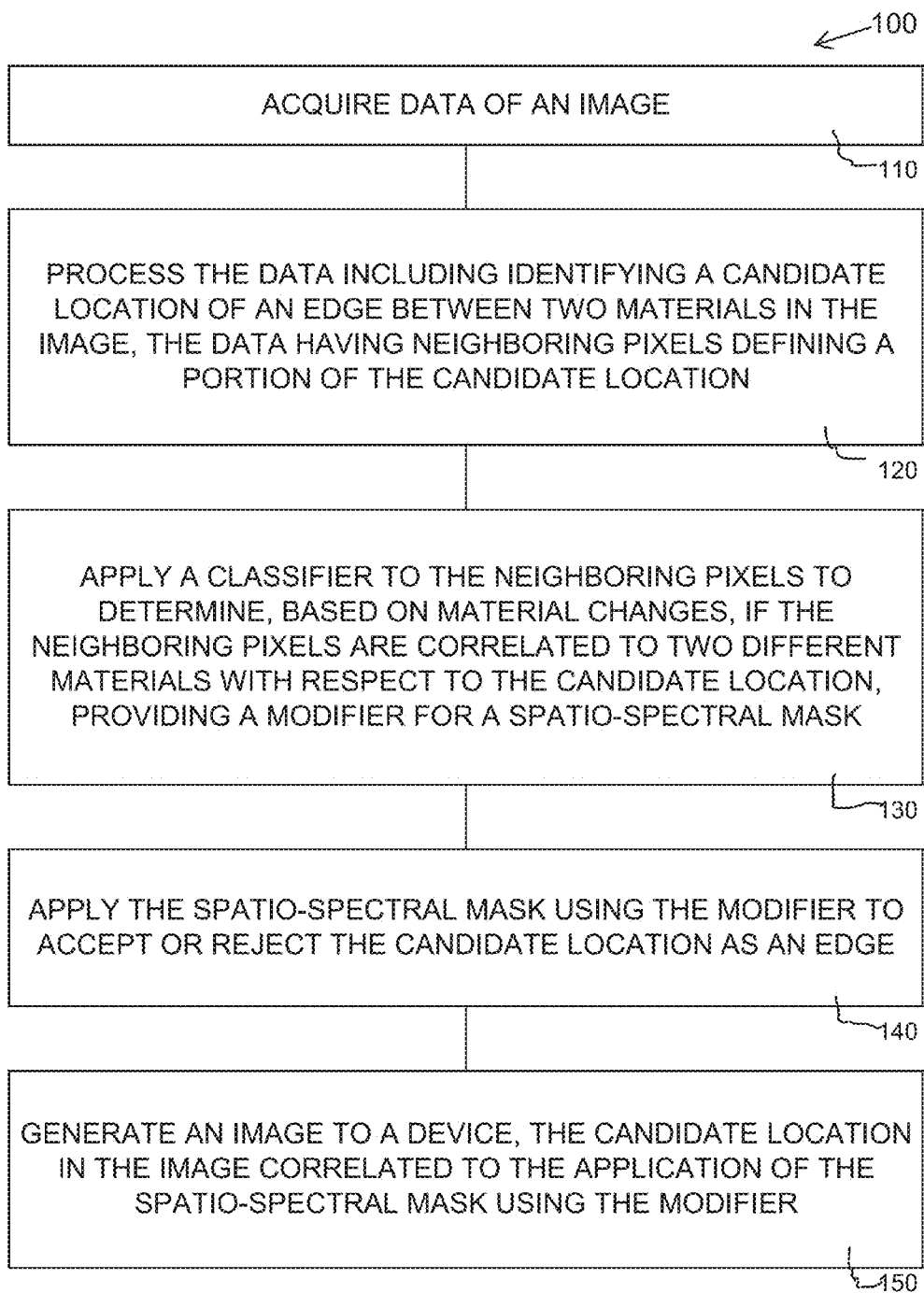
FIG. 1 shows features of an example method of material classification fused with spatio-spectral edge detection in spectral imagery, in accordance with various embodiments.

The following detailed description refers to the accompanying drawings that show, by way of illustration and not limitation, various example embodiments of the invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, a joint spatio-spectral algorithm can be implemented based on spectral-bands ratios along with classification information. An algorithm is herein, and generally, a self-consistent sequence of steps leading to a desired result. The steps are those using physical manipulations of physical quantities. These quantities may take the form of physical structures responsive to electrical, magnetic, or optical signals, where various of the physical structures are capable of being stored, transferred, combined, compared, and otherwise manipulated.

By judiciously selecting the few and most relevant spectral bands to maximize the contrast between pairs of materials, a small set of ratios of spectral-band features can be defined that most profoundly identify edges between each pair of materials. The collection of relevant bands and the corresponding ratios are termed herein as the edge signature. In order to obtain the collection of relevant bands and the corresponding ratios, prior knowledge of the spectral characteristics of the materials in the scene can be utilized. For example, such prior knowledge can be obtained from a library of spectral data. Through this stage, the algorithms, taught herein, achieve substantial levels of data compression as compared with the MCG or HySPADE algorithms.

In conjunction with a spatial mask, the few spectral bands from the edge signature give rise to a multispectral operator that can be viewed as a sparse, three-dimensional (3D) mask, which is at the heart of the edge-detection algorithms taught herein. The 3D mask does not operate on a single image plane but instead it fuses spectral information from multiple image planes with spatial information. A first algorithm, termed the Spectral Ratio Contrast (SRC) edge detection algorithm, defines the edge map of a spectral image by matching the output of the 3D mask with the ratios from the edge signature. See U.S. Pat. No. 8,649,607, "SPECTRAL RATIO CONTRAST FOR EDGE DETECTION IN SPECTRAL IMAGES," which is incorporated herein by reference in its entirety. A second algorithm is an extension of the SRC algorithm and utilizes spectral classification to further enhance the detection of edges due to material (not intensity) changes. Herein, this extended process is termed the Adaptive Spectral Ratio Contrast (ASRC) edge detection algorithm, since it adaptively changes the SRC algorithm sensitivity to edges (at each pixel) by considering the material-classification results of the neighboring pixels. The SRC detects edges that arise from both intensity and spectral changes while the extension portion of the ASRC detects edges based on spectral changes only.

The sparse spatio-spectral mask used in the SRC and the ASRC algorithms is an important mark of distinction from the MCG-based edge detector and other multispectral edge-detection algorithms. A second key distinctive mark of the two algorithms is that they are not derivative-based: edge detection is effected by matching an edge signature rather than by measuring the gradient's magnitude. Moreover, the application of spectral ratios to define multispectral operators for edge detection provide for a new research direction. It is noted that spectral ratios have been previously used in many techniques for quantitative vegetation monitoring, regional seismic discrimination, and deblurring of noisy multichannel images.

The ASRC algorithm is an extension of the SRC that includes critical information resulting from multispectral classification of the type of material of the very spectral image whose edges are to be identified. Different from the SRC algorithm, the ASRC algorithm utilizes the classification information to modify its edge-detection thresholds according to which the edges are declared, at each candidate location for an edge, according to the classification results for the surrounding pixels. Material classification of neighboring pixels can be utilized to adaptively pre-qualify the spectral ratios of the spatio-spectral mask (from the SRC stage common to the ASRC process) in order to specialize a portion of the ASRC algorithm, which is an extension of the SRC process, to capturing edges that are due solely to material changes and not intensity changes. By specializing the ASRC to material changes, its tolerance to noise is increased, thereby minimizing the false edges.

There are a number of features provided by the ASRC technique. The ASRC algorithm provides a method to fuse pixel-classification based on the material it represents and edge detection. The integration of critical information from a classifier to an edge-detection algorithm, in this case the SRC algorithm, enhances the capabilities of the combined algorithm. This critical information from pixel classification does not require more data or additional knowledge than that required by the SRC algorithm; it only requires more computations (3 fold in examples discussed herein) to extract such information from the same data the SRC algorithm uses. The utilization of classification step to enhance edge detection is a method to integrate information regarding the spatial location of the materials within the scene under test. The ASRC algorithm enables adaptive edge detection depending on both the spectral diversity of the materials and their spatial location, for each pair of materials within the scene. This means that the ASRC adaptively changes its sensitivity (compared to that from the SRC algorithm) in order to discard those edges that are not due to material change. The ASRC algorithm establishes a method to specialize the applicability of a wide-range of edge-detection algorithms into a particular task, by including extra constraints to the decision stage.

In a particular embodiment, the original SRC algorithm from a detector of all types of edges can be specialized into an algorithm that includes a portion of the algorithm to detect edges solely due to material change. The inclusion of critical information from pixel classification allows the ASRC algorithm to increase its tolerance to noise. The inclusion of critical information from pixel classification enables a better detection of isoluminant edges, namely those edges that are characterized by presenting same intensity for a single color image slice but exhibiting a jump in color. The inclusion of critical information enables the detection of edges between each pair of materials, without false edges triggered by other materials with similar spectrum. The edges for each pair of materials resulting from the ASRC algorithm can be used to produce a "clean" segmentation of the materials within the scene. Namely, the ASRC can be used to perform thematic classification.

FIG. 1 shows features of an embodiment of an example method 100 of material classification fused with spatio-spectral edge detection in spectral imagery. At 110, data of an image is acquired. At 120, the data is processed including identifying a candidate location of an edge between two materials in the image, where the data has neighboring pixels defining a portion of the candidate location. Processing the data including identifying a candidate location of an edge can include defining an edge signature between the two materials using a ratio of spectral bands that maximize spectral contrast between the two materials in the data of the image.

At 130, a classifier is applied to the neighboring pixels to determine, based on material changes, if the neighboring pixels are correlated to two different materials with respect to the candidate location, providing a modifier for a spatio-spectral mask. The spatio-spectral mask can be non-separable into spectral and spatial components. Applying the classifier to the neighboring pixels can include adaptively pre-qualifying spectral ratios of the spatio-spectral mask to capture the edge due solely to material changes. The classification allows use of machine learning to verify whether two pixels are on a boundary between two different materials.

At 140, the spatio-spectral mask using the modifier can be applied to accept or reject the candidate location as an edge. The modifier fused with the spatio-spectral mask can incorporate machine learning with edge detection that uses spatial and spectral features. Applying the spatio-spectral mask using the modifier can include modifying an edge-detection threshold, the edge-detection threshold being a threshold according to which an edge is declared. With respect to the edge signature, applying the spatio-spectral mask using the modifier can include using the modifier in an indicator matrix, each element of the indicator matrix correlated to a comparison of a difference of the spatio-spectral mask and the edge signature for a respective neighborhood of the candidate location with respect to a product of a respective modifier and a tolerance parameter. The respective modifier can be set to a numerical value of one if the two materials are determined to be different and to a value of zero if the two materials are determined to be the same.

At 150, an image generated to a device, the candidate location in the image correlated to the application of the spatio-spectral mask using the modifier. Realized as a visual display, a printing unit, a memory that stores the processed image data in formats useable by other devices, or other devices that operate with processed data images.

In various embodiments, methods of material classification fused with spatio-spectral edge detection in spectral imagery similar to method 100 can include generating classification information for pixels surrounding each candidate location for the edge by applying the classifier to the pixels surrounding each candidate location; and modifying edge-detection thresholds using the classification information for the surrounding pixels, the edge-detection thresholds being thresholds according to which edges are declared. In various embodiments, a method of material classification fused with spatio-spectral edge detection in spectral imagery similar to method 100 can include identifying a plurality of candidate locations of a plurality of edges of a plurality of materials by defining a plurality of edge signatures between the plurality of materials on a pairwise basis using a ratio of spectral bands that maximize spectral contrast between the materials of each pair; defining a plurality of spatio-spectral masks equal in number to the number of edge signatures; and applying the classifier to neighboring pixels of each candidate location.

In various embodiments, a non-transitory machine-readable storage device can comprise instructions stored thereon, which, when performed by a machine, cause the machine to perform operations, the operations comprising one or more features similar to or identical to features of methods and techniques described herein. The physical structure of such instructions may be operated on by one or more processors. For example, executing these physical structures can cause the machine to perform operations to: acquire data of an image; process the data including identifying a candidate location of an edge between two materials in the image, the data having neighboring pixels defining a portion of the candidate location; apply a classifier to the neighboring pixels to determine, based on material changes, if the neighboring pixels are correlated to two different materials with respect to the candidate location, providing a modifier for a spatio-spectral mask; apply the spatio-spectral mask using the modifier to accept or reject the candidate location as an edge; and generate a segmented or edge-analyzed image to a device, the candidate location in the image correlated to the application of the spatio-spectral mask using the modifier. Further, a machine-readable storage device, herein, is a physical device that stores data represented by physical structure within the device. Examples of machine-readable storage devices can include, but are not limited to, read only memory (ROM), random access memory (RAM), a magnetic disk storage device, an optical storage device, a flash memory, and other electronic, magnetic, and/or optical memory devices.

In various embodiments, a system can comprise an interface to receive data of an image; and a processing unit operatively coupled to acquire the data received at the interface and to operate on the data. The processing unit can be structured to: process the data including identification of a candidate location of an edge between two materials in the image, the data having neighboring pixels defining a portion of the candidate location; apply a classifier to the neighboring pixels to determine, based on material changes, if the neighboring pixels are correlated to two different materials with respect to the candidate location, providing a modifier for a spatio-spectral mask; apply the spatio-spectral mask using the modifier to accept or reject the candidate location as an edge; and generate an image to a device, the candidate location in the image correlated to a result of the application of the spatio-spectral mask using the modifier. The device can include one or more of a display, a printing unit, or a memory unit. The processing unit can be structured to perform processing techniques similar to or identical to the techniques discussed herein. The processing unit may be arranged as an integrated unit or a distributed unit. The system can include a sensor to generate the data of the image. The sensor can include a quantum dots-in-a-well (DWELL) mid-infrared (IR) imager, and more generally, the sensor can include any spectral imager, including those that are spectrally tunable by means of electrical, optical or any other spectral tuning mechanism.

Figure 2:
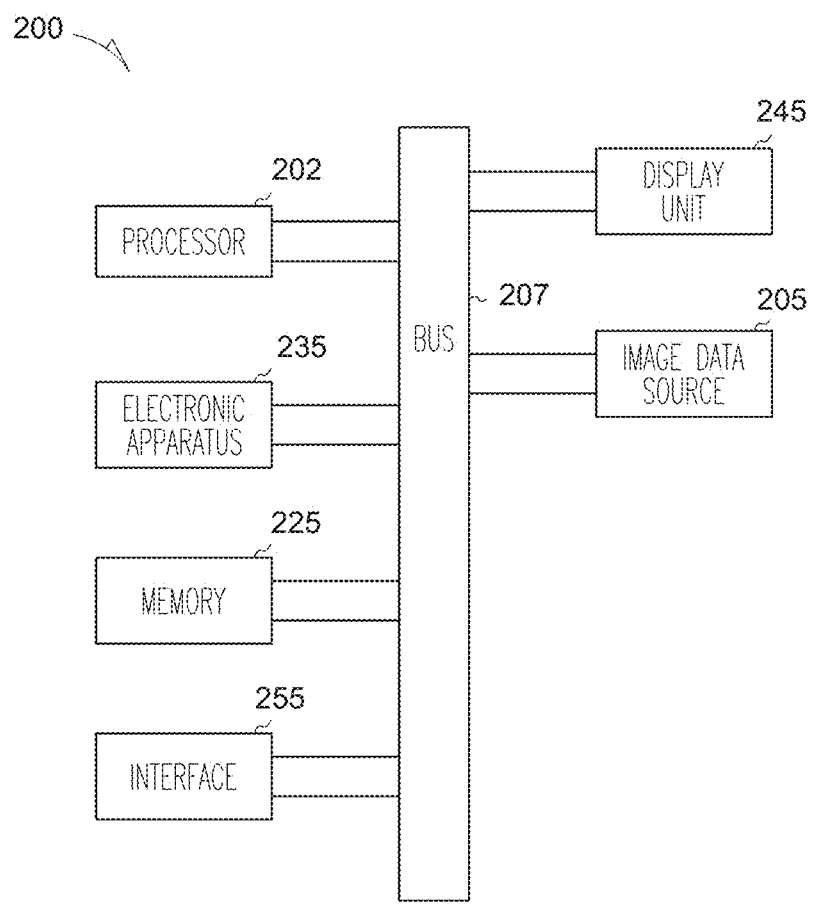
FIG. 2 shows an example embodiment of a system operable to provide images, in accordance with various embodiments.

FIG. 2 shows an example embodiment of a system 200 operable to provide images. System 200 includes an interface 255 to receive image data, a processor 202, and a memory 225 operatively coupled to processor 202. In an embodiment, processor 202 can be realized as a processor or a group of processors that may operate independently depending on an assigned function.

Memory 225 can include instructions stored thereon to operate according to algorithms and techniques discussed herein including, but not limited to, methods associated with FIG. 1. Memory 225 can have instructions stored thereon, which when executed by processor 202, cause the system to perform operations to acquire data of an image; to process the data including identifying a candidate location of an edge between two materials in the image, the data having neighboring pixels defining a portion of the candidate location; to apply a classifier to the neighboring pixels to determine, based on material changes, if the neighboring pixels are correlated to two different materials with respect to the candidate location, providing a modifier for a spatio-spectral mask; to apply the spatio-spectral mask using the modifier to accept or reject the candidate location as an edge; and to generate an image to a device, the candidate location in the image correlated to the application of the spatio-spectral mask using the modifier. Memory 225 can be realized as any type of non-transitory storage medium. Memory 225 provides a non-transitory machine-readable storage medium, which can have instructions stored thereon such that when the instructions are executed by processor 205, system 200 can perform operations including processing image data according to the teachings herein.

Interface 255 can be arranged to receive image data from an image data source 205. Image data source 205 can be realized as a sensor or as a repository of image data collected from a sensor. Image data source 205 can include, but is not limited to, a quantum-dot in a well (DWELL) infrared (IR) focal plane array (FPA), or any spectral imager, including those that are spectrally tunable by means of electrical, optical or any other spectral tuning mechanism.

Image data source 205 can be coupled directly to interface 255. Image data source 205 can be coupled to interface 255 via bus 207. Image data source 205 can be coupled to interface 255 via other communication mechanisms such as wireless communications.

Bus 207 can provide electrical conductivity among the components of system 200. Bus 207 can include an address bus, a data bus, and a control bus, each independently configured. Bus 207 can be realized using a number of different communication mediums that allows for the distribution of components of system 200. Use of bus 207 can be regulated by processor 202. Bus 207 provides a mechanism to operatively couple image data source 205 to a processing unit, such as provided by processor 202 and memory 225. The processing unit may be realized as an integrated unit as a distributed unit and may include other components of system 200.

Display units 245 can be arranged to receive images processed using various algorithms and techniques as taught herein. Display units 245 can be realized as a video display, a printing unit, a memory that stores the processed image data in formats useable by other devices, or other devices that operate with processed data images. In various embodiments, electronic apparatus 235 can include additional display units, additional storage memory, and/or other control devices that may operate in conjunction with processor 202 and/or memory 225.

Further discussion of material classification fused with spatio-spectral edge detection in spectral imagery is provided in the following, which is organized as follows. In Section I, the SRC and the ASRC algorithms are discussed. In Section II, results of applying the algorithm to real data from an Airborne Hyperspectral Imager (AHI) and a quantum dots-in-a-well (DWELL) mid-infrared (IR) imager are presented and are compared to the performance to results from the Canny, MCG, and HySPADE edge detectors. In Section III, a complexity analysis of the algorithms is presented. Further discussions are presented in Section IV.

I. Spectral Ratio Contrast Algorithm for Edge Detection

An MS or HS image, also termed an image cube, is a 3D array of real numbers that can be denoted by $u \in \mathbb{R}^{I \times J \times K}$, where I and J represent the number of horizontal and vertical pixels, respectively, in the spatial domain, and K represents the number of spectral bands. Any element of the cube u can be denoted as $u_k(i, j)$, where $1 \leq i \leq I$, $1 \leq j \leq J$, and $1 \leq k \leq K$. The value of $u_k(i, j)$ is referred to as the intensity of the kth band at spatial location (i, j). For a fixed spatial location (i, j), the K-dimensional vector $u(i, j) = (u_1(i, j), \ldots, u_K(i, j))$ is termed a hyper-pixel. Meanwhile, for a fixed band index k, the two-dimensional array $u_k(\bullet, \bullet)$ defines the kth image plane (color slice) of the spectral image.

The approach herein includes defining an edge map, $$\mathcal{F}: \mathbb{R}^{I \times J \times K} \mapsto \{0,1\}^{I \times J}$$

that assigns the value 1 to the pixel location (i, j) if u(i, j) belongs to an edge, while assigning the value 0 otherwise. Herein, an edge is defined to be either a jump in the broadband intensity (as in the conventional definition of an edge for gray-scale images) or a change in the material that exhibit color contrast but not necessarily luminance contrast (as in isoluminant edges). The SRC algorithm was designed with the objective of detecting both types of edges. To reduce the detection of false edges triggered by noise, and to improve the detection of isoluminant edges, the ASRC algorithm includes processing designed to detect edges that are purely due to changes in the material.

For two types of materials A and B, the edge map $F_{AB}$ can be built in three stages: (i) model-based edge signature identification, (ii) sparse spatio-spectral mask development, and (iii) edge discrimination. The SRC and the ASRC algorithms share the first two stages, but they differ in the third stage, where the latter involves spectral classification before discriminating the edges. For simplicity, both algorithms are described assuming only two distinct materials A and B in scenes, and later the extensions to multiple materials are described.

A. Model-Based Edge Signature Identification

Given two distinct materials A and B in a scene that is probed by a sensor, those bands for A and B are sought whose ratios can best identify the spatial locations that correspond to the boundary points between the two materials. Let $E_{AB}$ denote the set of all spatial indices, in the cube resulting from imaging the scene containing materials A and B, that are boundary points between materials A and B, and let $a=(a_i, \ldots, a_K)$ and $b=(b_1, \ldots, b_K)$ denote hyper-pixels corresponding to materials A and B, respectively. For example, the vector a can be obtained by taking the average of all hyper-pixels as material A is probed by the sensor. The spectral ratio index between materials A and B can be defined as the K×K matrix $$A/B \triangleq \begin{pmatrix} \frac{a_1}{b_1} & \cdots & \frac{a_1}{b_K} \\ \vdots & \ddots & \vdots \\ \frac{a_K}{b_1} & \cdots & \frac{a_K}{b_K} \end{pmatrix}. \quad (1)$$

The signature of the edge between materials A and B can be defined as a small collection of size R, where R<<K, of elements of (1) that can reliably identify, as described below, the edge's spatial indices, $E_{AB}$. The edge signature can be denoted by $$\epsilon_{AB}\{(p_1,q_1,\rho_1), \ldots, (p_R,q_R,\rho_R)\}, \quad (2)$$

where $p_r$ and $q_r$ are the band indices associated with the ratios $\rho_r = a_{p_r}/b_{q_r}$, $r=1, \ldots, R$. The integer R is the length of the edge signature.

The selection of the triplets $(p_r, q_r, \rho_r)$, $r=1, \ldots, R$, can be made as follows. First, select S bands $\{i_1, \ldots i_S\}$, where the materials A and B exhibit maximum separation, that is, $$i_1 = \underset{1 \leq i \leq K}{\arg\max} |a_i - b_i|,$$

$$i_2 = \underset{\substack{1 \leq i \leq K, \\ i \neq i_1}}{\arg\max} |a_i - b_i|,$$

$$\vdots$$

$$i_S = \underset{\substack{1 \leq i \leq K \\ i \neq i_1, \ldots, i_{S-1}}}{\arg\max} |a_i - b_i|.$$

Clearly, in the case of HS imagery, the search for the best S bands will be in a larger space compared to the case of MS imagery, but the same procedure can be utilized in both types of imagery. Hence, once the edge signature is obtained the complexity associated with processing MS and HS imagery are identical. Next, the spectral ratios can be computed using all possible band combinations: $\rho_{pq}=a_{i_p}/b_{i_q}$, $1 \leq p, q \leq S$. Without loss of generality, one may assume that all ratios are less than or equal to unity. If $\rho_{pq}>1$ for some p and q, it can be replaced by its reciprocal. $\epsilon_{AB}$ can be defined by selecting the R ratios that exhibit the strongest spectral contrast between the classes.

To rank the ratios according to their spectral contrast, it is noted that owing to the convention that $\rho_{pq} \leq 1$, the ratios closest to zero correspond to the strongest spectral contrast between any two bands. Thus, the first pair of bands, $(p_1, q_1)$, can be selected as the pair corresponding to the smallest ratio, $$\rho_1 = \rho_{p_1 q_1} = \arg \underset{1 \leq p,q \leq S}{\min} \rho_{pq},$$

the second pair of bands $(p_2, q_2)$ as the pair corresponding to the next smallest ratio $$\rho_2 = \rho_{p_2 q_2} = \arg \underset{\substack{1 \leq p,q \leq S \\ p \neq p_1 \\ q \neq q_1}}{\min} \rho_{pq},$$

and so on. The ordered band indices and the corresponding ranked ratios can be combined to define the R triplets in the edge signature in equation (2). Since all the ratios are less than or equal to unity, it can be easily shown that the definition of the edge signature is invariant under the change in the order of the materials A and B.

B. Sparse Spatio-Spectral Mask Development

A spatial mask, $\mathcal{M}$, at a pixel (i, j) can be denoted as a list of pixel pairs surrounding the pixel of interest. More precisely, $\mathcal{M}(i, j)$ is the union of M neighborhoods of pixels, $\mathcal{M}(i,j) = \cup_{m=1}^{M} \mathcal{N}_m(i, j)$, where each neighborhood consists of two distinct pixels surrounding (i, j), i.e., $\mathcal{N}_m(i,j) = \{u^{m-}(i, j), u^{m+}(i, j)\}$. For example, one can define a 3×3 mask centered at the pixel (i, j) that excludes the center pixel by taking the union of four neighborhoods, $\mathcal{N}_1 = \{u^{1-}(i, j), u^{1+}(i, j)\} = \{u(i-1, j), u(i+1, j)\}$, $\mathcal{N}_2 = \{u^{2-}(i, j), u^{2+}(i, j)\} = \{u(i, j-1), u(i, j+1)\}$, etc.

Next, the operation of the joint spatio-spectral mask at the $(i, j)^{th}$ pixel can be defined by computing the ratios between each of the M pixel pairs of the spatial mask $\mathcal{M}$, at each of the R band pairs given in the edge signature of equation (2). For example, using the pair of hyper-pixels defined by $\mathcal{N}_1$ and the pair of bands given by first triplet of the edge signature, $(p_i, q_i, \rho_i)$, one can define the ratios $u_{p_1}^{1-}(i, j)/u_{q_1}^{1+}(i, j)$ and $u_{p_1}^{1+}(i, j)/u_{q_1}^{1-}(i, j)$. Namely, the application of the spatio-spectral mask to each location (i, j) results in a 2M×R matrix of "features." (Compare this to a gray-scale image when the application of a spatial mask to a pixel results in a scalar.) Now, the application of the spatio-spectral mask to the entire image cube defines the mapping $$\mathcal{K}_{AB} : \mathbb{R}^{I \times J \times K} \mapsto (\mathbb{R}^{2M \times R})^{I \times J}, \quad (3)$$

where the $(i, j)^{th}$ entry of $\mathcal{K}_{AB}(u)$ will be a 2M×R feature matrix of spectral ratios given by $$\kappa_{AB}(u)(i,j) = \begin{pmatrix} \frac{u_{p_1}^{1-}(i,j)}{u_{q_1}^{1+}(i,j)} & \cdots & \frac{u_{p_R}^{1-}(i,j)}{u_{q_R}^{1+}(i,j)} \\ \vdots & \ddots & \vdots \\ \frac{u_{p_1}^{M-}(i,j)}{u_{q_1}^{M+}(i,j)} & \cdots & \frac{u_{p_R}^{M-}(i,j)}{u_{q_R}^{M+}(i,j)} \\ \frac{u_{p_1}^{1+}(i,j)}{u_{q_1}^{1-}(i,j)} & \cdots & \frac{u_{p_R}^{1+}(i,j)}{u_{q_R}^{1-}(i,j)} \\ \vdots & \ddots & \vdots \\ \frac{u_{p_1}^{M+}(i,j)}{u_{q_1}^{M-}(i,j)} & \cdots & \frac{u_{p_R}^{M+}(i,j)}{u_{q_R}^{M-}(i,j)} \end{pmatrix} \quad (4)$$

For convenience, the entries of the matrix $K_{AB}(u)(i,j)$ can be denoted as $$\kappa_{AB}(i,j;m^-,r) = u_{p_r}^{m-}(i,j)/u_{q_r}^{m+}(i,j),$$

and $$\kappa_{AB}(i,j;m^+,r) = u_{p_r}^{m+}(i,j)/u_{q_r}^{m-}(i,j).$$

The use of both $\kappa_{AB}(i,j;m^-,r)$ and $\kappa_{AB}(i,j;m^+,r)$ can be conducted to account for the two possible material configurations at the $m^{th}$ hyper-pixel pair. Specifically, the first ratio captures the case when the hyper-pixel $u^{m-}(i,j)$ is, for example, from material A and $u^{m+}(i,j)$ is from material B, whereas the second ratio is used to account for the possibility that $u^{m-}(i,j)$ is from material B and $u^{m+}(i,j)$ is from material A. Therefore, the use of the two ratios removes dependence on the direction of the transition between A and B, and it is similar to use of the magnitude in the gradient operator to achieve its rotational invariance.

To illustrate the functionality of the joint spatio-spectral mapping of equation (3), consider a simple example for which the spatial mask is comprised of the simple neighborhoods $\mathcal{N}_1$ and $\mathcal{N}_2$ described earlier and an edge signature whose length is unity (M=2 and R=1). Note that in this example $K_{AB}(u)(i,j)$ is a 4×1 matrix given by $$\kappa_{AB}(u)(i,j) = \begin{pmatrix} u_{p_1}^{1-}(i,j)/u_{q_1}^{1+}(i,j) \\ \vdots \\ u_{p_1}^{2-}(i,j)/u_{q_1}^{2+}(i,j) \\ u_{p_1}^{1+}(i,j)/u_{q_1}^{1-}(i,j) \\ u_{p_1}^{2+}(i,j)/u_{q_1}^{2-}(i,j) \end{pmatrix}. \quad (5)$$

Figure 3:
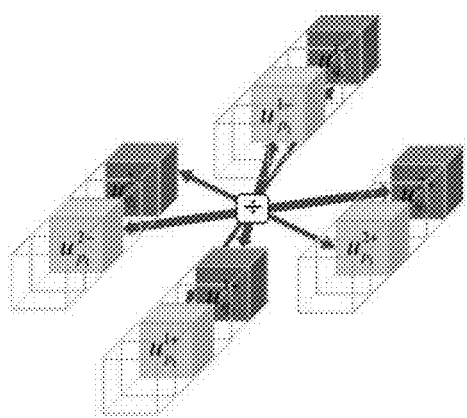
FIG. 3 is a representative joint spatio-spectral mask for two neighborhoods and an edge signature, in accordance with various embodiments.

A visual illustration of the computation of the row elements in this matrix is shown in FIG. 3. FIG. 3 is a representative joint spatio-spectral mask, $K_{AB}(u)(i,j)$, for the neighborhoods $\mathcal{N}_1$ and $\mathcal{N}_2$ and edge signature $\epsilon_{AB}$. Bold arrows are utilized to represent the first two ratios and regular arrows are used to represent the last two ratios in the example discussed. This figure shows that, unlike a conventional mask, $K_{AB}(u)$ does not operate on a single image plane of the image cube but instead it fuses information from different planes in a nonlinear fashion. Note that the spatio-spectral mask is generally non-separable, i.e., it cannot be written as the product of an operator acting solely in the spatial domain and another operator acting in the spectral domain. Next, development of the edge discrimination stage for the SRC algorithm is discussed. Later, the same stage is modified to generate the ASRC algorithm.

C. Edge Identification

The third stage of the SRC algorithm is the utilization of the sparse spatio-spectral mask (3), to identify the edges between materials A and B. The edge-identification process, taught herein, is based on the following rationale. In the ideal case, when no noise is present and the image under test is comprised only of hyper-pixels with the exact same value of the characteristic hyper-pixels a and b, the output of the spatio-spectral mask will perfectly match the values of the ratios obtained from the edge signature. To illustrate this point, assume the same example given earlier, where the spatio-spectral mask is given by equation (5). With a horizontal edge, the second and fourth ratios will have a value that is not meaningful, but the first or third ratio will match the ratio from the edge signature, $\rho_{p_1 q_1} = a_{p_1}/b_{q_1}$. Indeed, if the upper pixel is from material A and the lower pixel is from material B, then the first entry of equation (5) will be $u_{p_1}^{1-}(i,j)/u_{q_1}^{1+}(i,j) = a_{p_1}/b_{q_1}$ (which matches $\rho_{p_1 q_1} = a_{p_1}/b_{q_1}$) and the third entry will be $u_{p_1}^{1+}(i,j)/u_{q_1}^{1-}(i,j) = b_{p_1}/a_{q_1}$. Conversely, when the upper pixel is from material B and the lower pixel is from material A, the computed ratios are switched, which means that the third entry of equation (5) matches $\rho_{p_1 q_1} = a_{p_1}/b_{q_1}$. This example shows that if an edge is present then at least one row of $K_{AB}(u)(i,j)$ will perfectly match the ratios from the edge signature.

When noise is present, a matching tolerance can be allowed to account for the similarity between the outcome of the mask and the edge signature ratios. This can be accomplished by defining the mapping $$\Delta:(\mathbb{R}^{2M \times R})^{I \times J} \mapsto (\{0,1\}^{M \times R})^{I \times J},$$

where the $(i,j)^{th}$ entry of $K_{AB}(u)$ is used to form the M×R binary indicator matrix $$\Delta(\kappa_{AB}(u))(i,j) = \begin{pmatrix} \delta_1^1(i,j) & \cdots & \delta_R^1(i,j) \\ \delta_1^2(i,j) & \cdots & \delta_R^2(i,j) \\ \vdots & \ddots & \vdots \\ \delta_1^M(i,j) & \cdots & \delta_R^M(i,j) \end{pmatrix} \quad (6)$$

and the entries $\delta_r^m(i,j)$ are assigned the values of 0 or 1 according to the rule $$\delta_r^m(i,j) = \begin{cases} 1, & \text{if } |\kappa_{AB}(i,j;m^-,r) - \rho_r| < \epsilon, \\ 1, & \text{if } |\kappa_{AB}(i,j;m^+,r) - \rho_r| < \epsilon, \\ 0, & \text{otherwise.} \end{cases} \quad (7)$$

Here, the tolerance parameter, $\epsilon$, accounts for both the natural variability and the presence of noise in the spectral data for materials A and B.

Ideally, if the $m^{th}$ hyper-pixel pair belongs to the same material type, then the test in equation (7) will return the value of zero. Conversely, if the hyper-pixels forming the pair are from the two different materials, either the entry $\kappa_{AB}(i,j;m^-,r)$ or $\kappa_{AB}(i,j;m^+,r)$ will be equal to the corresponding ratio $\rho_r$ from the edge signature, $\epsilon_{AB}$. As a result, the above test will return the value 1 for the elements $\delta_T^m$ in the $m^{th}$ row of equation (6). As such, for a given pair of pixels, the number of non-zero elements in the associated $m^{th}$ row of the indicator matrix reveals the number of times the response of the mask $K_{AB}(u)(i,j)$ has matched (within the specified tolerance $\epsilon$) the spectral ratios from the edge signature $\epsilon_{AB}$.

Because the pixel pairs used to form the rows of the mask correspond to different edge orientations (horizontal, vertical or diagonal), the number of ones in each row of equation (6) indicates the strength of the edge at position (i, j) for that particular direction. One way to account for such strength is by computing the matrix infinity norm equation (6). Specifically, one can define the mapping $$\Phi:(\{0,1\}^{M \times R})^{I \times J} \mapsto \{0,1\}^{I \times J},$$

which converts the indicator matrix (6) into an edge map by $$\Phi(\Delta(\kappa_{AB}(u)))(i, j) = \begin{cases} 1, & \text{if } \|\Delta(\kappa_{AB}(u))(i, j)\|_\infty \geq \tilde{R} \\ 0, & \text{otherwise,} \end{cases} \quad (8)$$

where for any matrix A, $\|A\|_\infty = \max_{1 \leq i \leq M} \sum_{j=1}^{R} |a_{ij}|$, and $\tilde{R} \leq R$ is a specified threshold. With the definition in equation (8), the (i, j) location will belong to the collection $E_{AB}$ of edges if the edge strength in at least one direction, as measured by the number of ones in the rows of equation (6), exceeds the threshold $\tilde{R}$. If none of the edge strengths exceeds $\tilde{R}$, then the (i, j) site does not belong to $E_{AB}$. The value of the threshold $\tilde{R}$ can be used to adjust the sensitivity of the edge detector to noise. For example, increasing $\tilde{R}$ makes the algorithm less sensitive to noise but more restrictive.

The edge map can be defined as the function composition $$\mathcal{F}_{AB} = \Phi \circ \Delta \circ \mathcal{K}_{AB}.$$

Note that $\mathcal{K}_{AB}$ is the only problem-specific component in $\mathcal{K}_{AB}$ the functions $\Delta$ and $\Phi$ are not problem specific. Because the edge signatures are determined independently for each pair of materials and the information from different color slices is properly fused, the SRC algorithm is particularly well-suited for scenes that contain both weak edges (e.g., isoluminant edges) and strong edges. In contrast, an MCG-based edge detector would require, for the detection of weak edges, reducing the threshold at the expense of producing false edges, as discussed in Section II. In the next subsection, an extension of the edge identification stage of the SRC algorithm is presented to benefit from locally-adaptive thresholding based on material classification.

D. Classifier-Enhanced Edge Discrimination

As shown in Section II, the SRC algorithm is capable of detecting edges that are due to intensity changes and edges that are due to spectral changes. In this subsection, development of the ASRC algorithm is discussed, which is directed to capturing edges that are due solely to material changes (and not intensity changes). By specializing a portion of the algorithm to material changes, its tolerance to noise is increased and the corresponding false edges are minimized.

In order to capture the changes between materials in the ASRC algorithm, material classification of neighboring pixels can be utilized to adaptively pre-qualify the spectral ratios before computing the indicator matrix of equation (6). The use of classification to enhance other tasks such as segmentation is an area that has already been studied. For example, a k-nearest neighbor classifier has been utilized to generate an initial segmentation of ribs in chest radiographs, which is iteratively updated using other features such as spatial distribution of the pixels by means of different classifiers. In various embodiments, classification can be fused into the SRC algorithm to minimize the effect of the misidentified pixels from the former algorithm and improve the edge identification stage of the latter.

Consider the feature matrix of the (i, j)$^{th}$ location, as $\mathcal{K}_{AB}(u)(i, j)$ as given in equation (4). The entries $\kappa_{AB}(i, j; m^\mp, r)$ of the feature matrix can be ranked with the following two objectives in mind: (i) promoting the thresholding of ratios (as edge candidates) when the spatio-spectral mask contains hyper-pixels from two distinct materials and (ii) discouraging the thresholding of ratios when the mask contains hyper-pixels from only one type of material. To do so, the data-dependent multiplicative factors $\gamma_{m,r}^{i,j}$ can be embedded with the tolerance in equation (7), which results in its redefinition as $$\delta_r^m(i, j) = \begin{cases} 1, & \text{if } |\kappa_{AB}(i, j; m^-, r) - \rho_r| < \gamma_{m,r}^{i,j} \epsilon, \\ 1, & \text{if } |\kappa_{AB}(i, j; m^+, r) - \rho_r| < \gamma_{m,r}^{i,j} \epsilon, \\ 0, & \text{otherwise,} \end{cases}$$

where the same multiplicative factor, $\gamma_{m,r}^{i,j}$, can be used for both tests in order to maintain the independence on the direction of the transition between materials.

The mathematical definition of the multiplicative factors $\gamma_{m,r}^{i,j}$ is as follows. Let $\mathcal{N}_u$ (i, j), $\mathcal{N}_r$ (i, j), $\mathcal{N}_l$ (i, j) and $\mathcal{N}_\ell$ (i, j) denote four neighborhoods surrounding the (i, j)$^{th}$ hyper-pixel of interest. The subscripts u, l, r and l stand for upper, lower, right and left neighborhoods, respectively. The understanding is that $\mathcal{N}_u$ (i, j) contains neighboring pixels above the hyper-pixel (i, j), $\mathcal{N}_\ell$ (i, j) contains neighboring pixels to the left of pixel (i, j), and so on. No restrictions are imposed on the four neighborhoods at this point. Let the function C: $\mathbb{R}^5 \mapsto \{0, 1\}$ be a classifier that maps each hyper-pixel to a class of materials, where outputs 0 and 1 represent classes A and B, respectively. Now for any collection of indices $\mathcal{N}$, the class of $\mathcal{N}$ is denoted by $C(\mathcal{N})$, which can be defined according to a certain prescribed classification rule.

Next, define $$\gamma_{m,r}^{i,j} = (C(\mathcal{N}_u) \oplus C(\mathcal{N}_l)) \vee (C(\mathcal{N}_r) \oplus C(\mathcal{N}_l)), \quad (9)$$

where $\oplus$ denotes the "exclusive OR" operation and the symbol "V" represents the "OR" operation. For simplicity of the notation, the (i, j) dependence of each neighborhood set $\mathcal{N}$ in equation (9) has been discarded with the understanding that each neighborhood is defined on a pixel-by-pixel basis.

From equation (9), $\gamma_{m,r}^{i,j}$ will be unity (in which case the (m, r)$^{th}$ pixel-band pair at the (i, j) location qualifies for thresholding as usual) if at least one of the opposite neighborhoods are classified as two different materials. On the other hand, $\gamma_{m,r}^{i,j}$ will be zero (in which case the (m, r)$^{th}$ pixel-band pair at the (i, j) location does not qualify for thresholding) if the declared class of each neighborhood is in agreement with the declared class of its opposite neighborhood. As a consequence, the ASRC will operate as the SRC algorithm only if the outcome of the classifier indicates the possible presence of an edge, suppressing edges that are due to an intensity change. This will also reduce the detection of false edges.

The fact that the ASRC algorithm includes a processing segment that is restricted to identifying edges based on color only is similar to that of the HySPADE algorithm; however, the algorithms are different. A key difference between the ASRC and the HySPADE algorithms is that the former utilizes the sparse, 3D mask of ratios to fuse spectral and spatial information to nonlinearly extract edge information, while the latter algorithm utilizes only spectral information to compute spectral angles, which are linear spatio-spectral features. Even though the HySPADE algorithm performs equally well compared to the SRC algorithm, its performance is worse than that of the ASRC algorithm in the presence of isoluminant edges. See, for example, FIG. 6. Moreover, as presented in Section III, the HySPADE algorithm requires a high number of operations per pixel (>10⁹ operations per pixel in the examples discussed herein), as compared with the operations used by the techniques taught herein (<90 operations per pixel in the examples discussed herein).

E. Extension of the Algorithms to Multiple Materials

For discussion purposes, the description of the extension of the techniques taught herein to multiple materials is directed to the case of three distinct materials A, B and C. The extension to the general case of more distinct materials is straightforward. Due to the invariability of the detector for the order of the materials, for three distinct materials A, B and C there are three possible edges: $E_{AB}$, $E_{AC}$, and $E_{BC}$. In this case, three edge signatures, $\epsilon_{AB}$, $\epsilon_{AC}$ and $\epsilon_{BC}$, are obtained from which three joint spatio-spectral masks $K_{AB}$, $K_{AC}$, and $K_{BC}$ can be defined. These masks can be used to identify the hyper-pixels belonging to the edge $E_{AB}$ between materials A and B, the hyper-pixels from the edge $E_{AC}$ between materials A and C, and the hyper-pixels from the edge $E_{BC}$ between materials B and C. The final edge map can be obtained by the union of the three edges:

$$E_{ABC} = E_{AB} \cup E_{AC} \cup E_{BC}.$$

II. Experimental Results

Raw HS imagery from the AHI sensor, and raw MS imagery from the DWELL sensor were employed. In order to create a more challenging scenario for the algorithms, the data can be normalized by their broadband intensity. The normalization minimizes the role of broadband emissivity in the discrimination process and emphasizes the spectral contrast.

For the AHI dataset, only a qualitative comparison of the algorithms was performed since the ground-truth information is not available for this dataset. On the other hand, for the data from the DWELL sensor both qualitative and quantitative assessment of the algorithmic techniques, as taught herein, and the benchmark algorithms were performed as the ground-truth information is available.

The outcome of the algorithmic techniques, as taught herein, was compared with the edge maps obtained by the Canny algorithm applied to selected bands, the MCG algorithm, and the HySPADE algorithm. Attention is restricted to edge signatures with unity length using two bands (that is, S=2 and R=1), which is the minimum value required by the algorithms. Moreover, a 3×3 spatial mask was utilized to construct the joint spatio-spectral mask, $K_{AB}$. Within the spatial mask, four directions can be identified, each one associated with a pair of pixels: horizontal, vertical and the two diagonals, i.e., M=4. For the ASRC algorithm, the distance-based Euclidean classifier was selected for its simplicity and the good results observed; the neighborhood sets $\mathcal{N}_u(i,j)$, $\mathcal{N}_l(i,j)$, $\mathcal{N}_r(i,j)$ and $\mathcal{N}_l(i,j)$ are defined within the same 3×3 spatial mask used in the SRC algorithm. This choice of spatial mask, classifier and neighborhood sets is also considered for the complexity analysis in Section III.

A. Edge Detection Using AHI Imagery

The AHI sensor considered consisted of a long-wave IR (7 μm-11.5 μm) pushbroom HS imager and a visible high-resolution CCD linescan camera. The HS imager has a focal-plane array (FPA) of 256×256 elements with spectral resolution of 0.1 μm. For this study, AHI data was utilized that contains three different classes: building (B), ground (G) and road (R). The 200 low-noise bands out of the 256 available bands were utilized.

The calculated edge signatures (band indices and the corresponding responding ratios) for each pair of materials are summarized in Table I.

TABLE I

THE EDGE SIGNATURES BETWEEN
CLASSES B, G AND R OBTAINED FOR THE AHI DATA

| | Triplets $(p_1, q_1, \rho_1)$ | |
|---|---|---|
| Signatures | Raw data | Normalized data |
| $\epsilon_{BG}$ | (17, 16, 0.6941) | (3, 4, 0.8609) |
| $\epsilon_{RG}$ | (47, 46, 0.7949) | (3, 4, 0.8949) |
| $\epsilon_{BR}$ | (17, 16, 0.8706) | (16, 17, 0.9588) |

Figure 4:
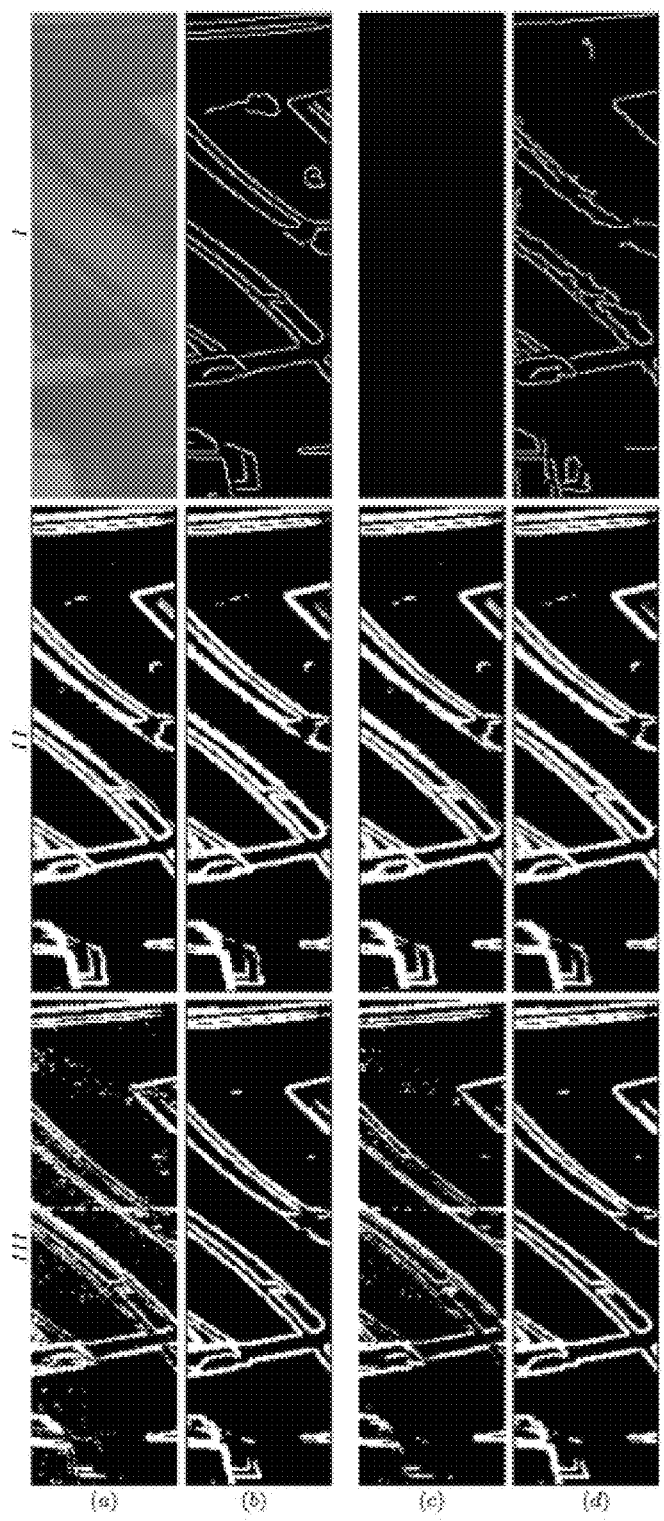
FIG. 4 shows a comparison among the edge maps obtained by the Canny, the Hyperspectral/Spatial Detection of Edges, the multicolor gradient, the Spectral Ratio Contrast, and the Adaptive Spectral Ratio Contrast algorithms for the raw sensor data and for the normalized data, in accordance with various embodiments.

FIG. 4 shows comparisons between the SRC and ASRC edge detectors with the edge signatures defined in Table 1 on the one hand, and the Canny, MCG, and HySPADE edge detectors on the other hand for the raw sensor data (first and second columns) and the normalized sensor data (third and fourth columns) for the AHI imagery. The first row, from left to right, shows raw AHI data at band 14, Canny edge map for raw AHI data at band 14, normalized AHI data at band 14, and Canny edge map for normalized AHI data at band 14. The second row, from left to right, shows MCG and SRC edge maps for AHI raw dataset and MCG and SRC edge maps for AHI normalized dataset. The third row, from left to right, shows HySPADE and ASRC edge maps for AHI raw dataset and HySPADE and ASRC edge maps for AHI normalized dataset. The Canny algorithm is applied to the same depicted image, which corresponds to the image plane at band 14. Recall that the MCG and the SRC algorithms detect edges characterized by both intensity and spectral changes. The HySPADE and ASRC algorithms, on the other hand, detect edges that exhibit a change in the spectral content only.

From the results presented in FIG. 4, it can be observed that the Canny edge detector performs very well when applied to the AHI raw image for spectral band 14 (row I, column b). However, when the algorithm is applied to the intensity-normalized image, the performance of the Canny algorithm significantly degrades (row I, column d). This degradation is a result of the fact that the Canny algorithm detects intensity changes only, and it is expected to perform optimally for high intensity contrast images such as the image in row I, column a.

The MCG and the SRC algorithms produce virtually the same edge maps when applied to raw sensor data (second row, columns a and b), with a clear computational advantage seen in the SRC algorithm by requiring only two spectral bands, whereas the MCG algorithm requires all the 200 available bands. When normalized data is used (second row, c and d columns), few edges in some areas are missed either by the SRC or the MCG algorithms. Nonetheless, the edge maps between the two algorithms are again comparable. Moreover, the results for the normalized case are very similar to those for the raw data case. These results show the advantage of the methods that utilize both intensity and spectral information over purely gray-scale algorithms such as Canny.

The ASRC algorithm (row III, column b) performs significantly better compared to the HySPADE algorithm (row III, column a) when applied to the AHI raw data. The edge map obtained by HySPADE exhibits noise and HySPADE also misses some of the edges that were detected by SRC, MCG and ASRC. The advantage of ASRC over HySPADE continues to be pronounced when both algorithms are applied to the normalized data (row III, columns d and c). The edge maps obtained by the ASRC algorithm applied to raw and normalized data (row III, columns b and d) are virtually identical. This is due to the fact that the ASRC algorithm detects edges based on changes of the spectral content only. As for HySPADE, the application of the algorithm to the normalized AHI data results in a slight degradation of the edge detection but overall reduction of the noise in the edge map compared to application to the raw AHI data (row III, column a). However, as in the case of ASRC, the edge maps are comparable. It is important to note that the edge maps obtained by the MCG, the SRC and the ASRC algorithms are very similar for both raw and normalized AHI data cases.

An important conclusion can be drawn from the results presented so far. By choosing only a few bands with maximum spectral separation and by allowing unrestricted band combinations to form the ratios, the SRC and ASRC algorithms with edge signatures that use the minimal possible length perform as well as the MCG algorithm and outperform the HySPADE algorithm. This is an important result because it lends itself to substantial data compression, compared to MCG, as well as fast processing, as compared to HySPADE. The SRC and ASRC algorithms offer a performance advantage over the Canny, the MCG, and the HySPADE algorithms for images that contain isoluminant edges as seen next for the DWELL imagery.

B. Edge Detection Using DWELL Imagery

The DWELL sensor used in these experiments was designed and fabricated at the Center for High Technology Materials at the University of New Mexico. The DWELL photodetector offers a unique property of spectral tunability that is continuously controllable through the applied bias voltage. This feature of the DWELL is a result of the quantum-confined Stark effect. In essence, a single DWELL photodetector can be thought of as a continuously tunable MS spectral detector, albeit with overlapping spectral bands.

Figure 5:
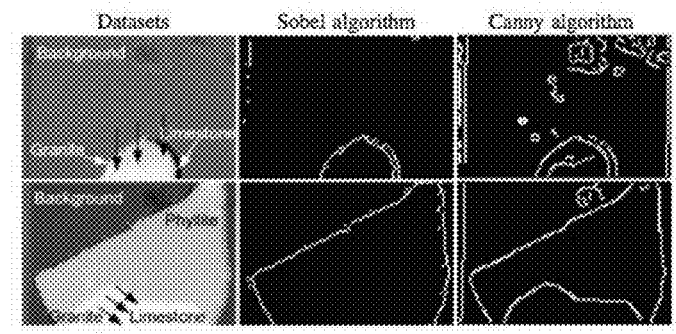
FIG. 5 shows two datasets and edge maps obtained by using Sobel and Canny edge detectors, in accordance with various embodiments.
Figure 6:
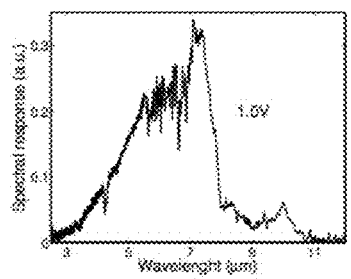
FIG. 6 shows the spectral response of the DWELL photodetector at an applied bias of 1.0 volt used with respect to the example of FIG. 5, in accordance with various embodiments.

In these experiments, a 320×256 DWELL FPA was utilized to image two different arrangements of rocks, as shown in FIG. 5 (first column). The first arrangement (top-left) is comprised of granite (G) and limestone (L) rocks (approximately 1-2 inch in diameter). The surrounding background (B) in this image corresponds to the opening of a blackbody source. The second arrangement (bottom-left) is comprised of the rocks phyllite (P), granite (G), and limestone (L), surrounded by the same background (B) as that in the first arrangement. Both examples contain an invisible isoluminant edge between the granite and the limestone rocks that exists on the tip of the black arrows. The edge maps shown in FIG. 5 were obtained by using the Sobel (second column) and the Canny (third column) edge detectors applied to raw DWELL-sensor data when the FPA is operated at 1.0V. The corresponding spectral response of the sensor at the applied bias of 1.0V is shown in FIG. 6.

Note that the Sobel edge detector has entirely missed the edge between granite and limestone rocks in both examples. Moreover, it has also failed to detect strong edges between both the granite-phyllite pair and the limestone-phyllite pair. However, the more sophisticated Canny edge detector picks up these strong edges, and it partially detects the isoluminant edge in the first examples. Nevertheless, the Canny algorithm does not detect the isoluminant edge in the second example.

By operating the DWELL sensor at ten different bias voltages, a multispectral cube was generated to test the proposed algorithms. The obtained edge signature triplets for all the possible combinations of material pairs for both datasets are summarized in Table II. In what follows, the DWELL imagery that contains background, granite, and limestone classes, as shown in FIG. 5 (top-left), is termed the first DWELL dataset, and the imagery that contains background, phyllite, granite, and limestone, as shown in FIG. 5 (bottom-left), is termed the second DWELL dataset.

TABLE II

EDGE SIGNATURES AMONG THE B, P, G, AND L CLASSES OBTAINED FOR THE DWELL DATASETS

| | Triplets ($p_1$, $q_1$, $\rho_1$) | |
|---|---|---|
| Signature | Raw data | Normalized data |
| $\epsilon_{GB}$ | (6, 7, 0.2747) | (1, 10, 0.1434) |
| $\epsilon_{LB}$ | (6, 7, 0.2636) | (1, 10, 0.1395) |
| $\epsilon_{LG}$ | (5, 6, 0.7577) | (9, 10, 0.9109) |
| $\epsilon_{PL}$ | (4, 5, 0.5703) | (9, 10, 0.8444) |
| $\epsilon_{PB}$ | (6, 7, 0.3168) | (1, 10, 0.2283) |
| $\epsilon_{PG}$ | (4, 5, 0.6006) | (9, 10, 0.8590) |

Figure 7:
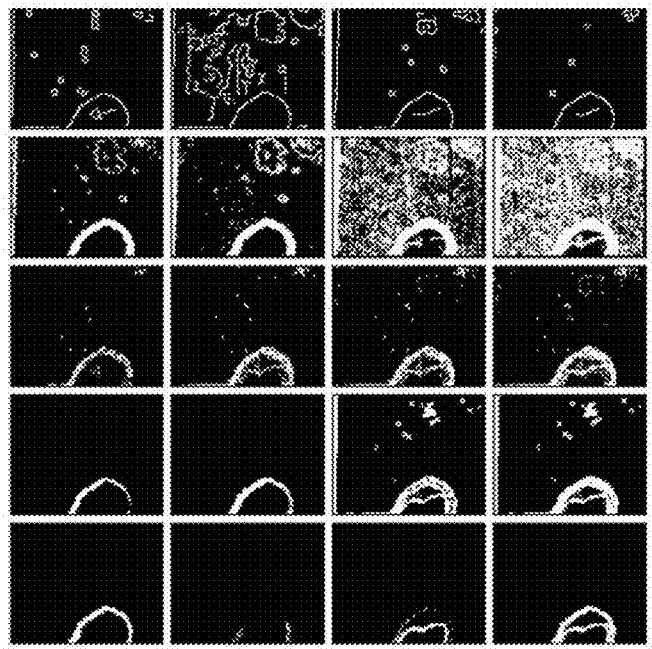
FIG. 7 shows comparison between the Canny algorithm applied to individual bands, multicolor gradient algorithm, Hyperspectral/Spatial Detection of Edges algorithm, Spectral Ratio Contrast algorithm, and Adaptive Spectral Ratio Contrast algorithm for the dataset containing granite and limestone rocks, in accordance with various embodiments.

The results for the first DWELL dataset for raw sensor data are shown in FIG. 7. FIG. 7 shows comparison between the Canny algorithm applied to individual bands (first row from the top), MCG algorithm (second row), HySPADE algorithm (third row), SRC algorithm (fourth row), and ASRC algorithm (fifth row) for the dataset containing granite (G) and limestone (L) rocks. The Canny algorithm was applied to the images at bands 1, 6, 8, and 9, respectively. It is important to note that some bands present a high number of false edges, whereas for other bands the isoluminant edges are detected. As such, the Canny algorithm can generate good edge maps, depending on the bands used, yet this capability is not offered consistently by the Canny algorithm. The MCG and HySPADE results are presented for a sequence of increasingly permissive tolerances in order to unveil the isoluminant edge. The last two rows show the SRC and ASRC edge maps, where the first column shows the edges between granite rock and the background ($E_{GB}$), the second column shows the edges between limestone rock and the background ($E_{LB}$), the third column shows the edges between limestone and granite rocks ($E_{LG}$), and the fourth column shows the combined edge maps.

The second and third rows show the results for the MCG and HySPADE algorithms, respectively, at different threshold values in order to unveil the isoluminant edge between the granite and limestone rocks. The MCG algorithm second row picks up the weak edge only after its tolerance is increased to a degree that results in the detection of a significant number of false edges (second row, fourth column). On the other hand, HySPADE offers a less-noisy edge map compared to the MCG algorithm; nonetheless, the background-granite and granite-limestone edges are not well defined, as shown in the third row, fourth column. Moreover, the high computational cost of the HySPADE algorithm makes it hard for the user to fine-tune its tolerances, which is a clear disadvantage of the HySPADE algorithm. It can also be observed that at the cost of a slight increase in the number of false edges, the SRC algorithm can clearly define the background-granite edge with respect to the granite-limestone edge (fourth row, fourth column). Finally, the results of the ASRC algorithm (fifth row, fourth column) are better than all the previous algorithms in terms of clearly defining both the strong and weak edges. The ASRC algorithm also discards all of the false edges in the background.

By utilizing the available ground-truth information for the DWELL datasets, reference edge maps were derived for the scenes under study. These edge maps were utilized to compute the empirical detection and false-alarm probabilities, $P_D$ and $P_F$, respectively, for the five algorithms (Canny applied on different bands, MCG, HySPADE, SRC and ASRC). The detection probability (also known as the sensitivity of the algorithm) corresponds to the probability that an actual edge (provided by the ground truth) is detected by the algorithm under evaluation. The false-alarm probability (also known as the complement of the specificity of the algorithm) is the probability that the algorithm detects a non-existing edge. For each algorithm, the respective parameters were tuned in order to unveil the isoluminant edges (the assessment was made by visual inspection). The algorithms' parameters were conditioned to detect isoluminant edges because they present one of the most challenging problems in multicolor edge detection. The metrics $P_D$ and $P_F$ were computed by comparing the ground-truth edge-map with the algorithm outcome on a pixel-by-pixel basis.

From the results presented in Table III, it can be seen that the best performance achieved by the Canny algorithm is when it is applied to band 9 ($P_D$=0.4533 and $P_F$=0.0082). It is important to note that the Canny algorithm, applied to this band, is capable to partially detect the isoluminant edge (see FIG. 5, top-right). However, without previous knowledge of the scene and the results of the application of the Canny algorithm to every band, it would be difficult to guess which band gives the best results. The MCG algorithm, on the other hand, cannot detect the isoluminant edges without producing a high number of false edges. Indeed, when the isoluminant edge is detected (second row, fourth column) the MCG performance is given by a high detection ($P_D$=0.9600) but also with a high false-alarm probability ($P_F$=0.6112). At the cost of a tremendous increase of computation complexity, the HySPADE algorithm outperforms the Canny algorithm in terms of sensitivity ($P_D$=0.7867) and the MCG algorithm in terms of low false-alarm probability ($P_F$=0.0565). In contrast, the SRC algorithm outperforms the previous algorithms in terms of both simplicity and sensitivity with $P_D$=0.9467, at the cost of a slight increase in the false-alarm probability ($P_F$=0.0862) in comparison to HySPADE. The ASRC algorithm outperforms all the other four algorithms having the highest detection and the lowest false-alarm probability, $P_D$=0.9733 and $P_F$=0.0244, respectively.

TABLE III

COMPARISON TABLE FOR THE $P_D$ AND $P_F$ RESULTS OF FIVE ALGORITHMS (CANNY, MCG, HYSPADE, SRC AND ASRC) FOR THE DATASET CONTAINING B, G AND L CLASSES (RAW DATA)

| Algorithm | Detection probability | False alarm probability |
| --- | --- | --- |
| Canny (band 9) | 0.4533 | 0.0082 |
| MCG | 0.9600 | 0.6112 |
| HySPADE | 0.7867 | 0.0565 |
| SRC | 0.9467 | 0.0862 |
| ASRC | 0.9733 | 0.0244 |

Figure 8:
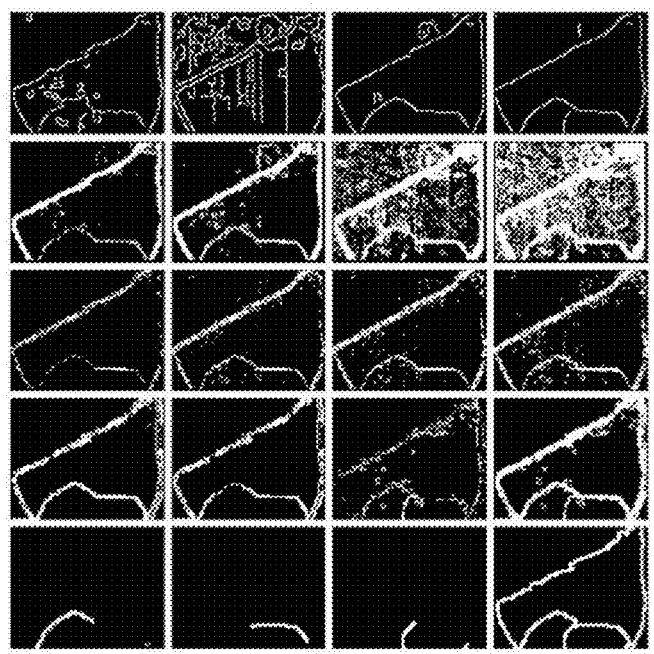
FIG. 8 shows comparison between comparison between the Canny algorithm applied to individual bands, multicolor gradient algorithm, Hyperspectral/Spatial Detection of Edges algorithm, Spectral Ratio Contrast algorithm, and Adaptive Spectral Ratio Contrast algorithm for the dataset containing phyllite, granite, and limestone rocks, in accordance with various embodiments.

The edge-detection results for the second DWELL dataset are presented in FIG. 8 for intensity-normalized data. FIG. 8 shows comparison between the Canny algorithm applied to individual bands (first row from the top), MCG algorithm (second row), HySPADE algorithm (third row), SRC algorithm (fourth row), and ASRC algorithm (fifth row) for the dataset containing phyllite, granite, and limestone rocks (second dataset). The MCG and HySPADE results are presented for a sequence of increasingly permissive tolerances in order to unveil the isoluminant edge. The last two rows show the SRC and ASRC edge maps, where the first column (from the left) shows the edges between phyllite and granite rocks ($E_{PG}$), the second column shows the edges between phyllite and limestone rocks ($E_{PL}$), the third column shows the edges between limestone and granite rocks ($E_{LG}$), and the fourth column shows the combined edge maps. Table IV summarizes the detection and false-alarm probabilities achieved by each one of the five algorithms for this dataset.

TABLE IV

COMPARISON TABLE FOR THE RESULTS OF FIVE ALGORITHMS (CANNY, MCG, HYSPADE, SRC AND ASRC) FOR THE DATASET CONTAINING B, P, G AND L CLASSES (NORMALIZED DATA)

| Algorithm | Detection probability | False alarm probability |
| --- | --- | --- |
| Canny (band 9) | 0.7854 | 0.0301 |
| MCG | 0.8802 | 0.5046 |
| HySPADE | 0.7445 | 0.0833 |
| SRC | 0.8593 | 0.0873 |
| ASRC | 0.8919 | 0.0652 |

The second dataset is more challenging than the first dataset because the two classes with the isoluminant edge (i.e., granite and limestone rocks) are now positioned against a phyllite backdrop that exhibits less contrast than the blackbody. Moreover, the data is intensity normalized. As before, the Canny edge detector achieves good performance when applied to band 9 ($P_D$=0.7854 and $P_F$=0.0301). It is very interesting to note that, for this band, the Canny algorithm is capable detecting the isoluminant edge between the granite and limestone rocks almost fully. This is because the normalization process smoothes some intensity peaks and improves the contrast between granite and limestone, for this particular band, as a secondary effect. This result proves that the first category of algorithms (those that do not use spectral information) can achieve good detection as long as the best band is identified through pre-processing of the data, which usually can be a very difficult requirement.

As for the MCG-generated edge maps, FIG. 8 (second row), the weak edge is detected only when the false-alarm probability reaches unacceptable levels. The HySPADE algorithm performs worst than the MCG algorithm ($P_D$=0.7445 and $P_F$=0.0833) and it is not capable of detecting the isoluminant edge. In contrast, the SRC algorithm recovers the strong edges as well as the weak edge between the granite and limestone rocks. Indeed, FIG. 8 (fourth row) shows a high-resolution weak edge captured by the SRC algorithm. The achieved detection and false-alarm probabilities of the SRC algorithm ($P_D$=0.8593 and $P_F$=0.0873) corroborate this observation. It is important to note that event though the SRC algorithm is able to detect isoluminant edges for challenging scenarios, it still suffers from detecting false edges for each pair of materials, as observed in both examples. However, the ASRC algorithm reduces the detection of false edges substantially ($P_F$=0.0652 for ASRC compared to $P_F$=0.0873 for SRC), owing to the fusion of material classification in the edge-detection process. The ASRC is also able to improve the detection of edges, as noted by the improved detection probability ($P_D$=0.8919 for ASRC compared to $P_D$=0.8593 for SRC).

From these results, it can be concluded that the SRC algorithm outperforms the MCG and HySPADE algorithms for the task of detecting edges using spectral data with minimal intensity contrast. Moreover, it performs as good as the Canny edge detector without the difficult requirement for pre-selecting the optimal band. At the cost of a slight increase in computational cost, the ASRC algorithm outperforms all other four algorithms presented herein. Next, the multicolor algorithms (SRC, ASRC, MCG and HySPADE) are compared in terms of their computational costs.

III. Complexity Analysis

In this section, the complexity of the feature extraction stage in the SRC and ASRC algorithms is estimated and compared to those for the MCG and the HySPADE algorithms. Since the edge signature identification is made offline and before the edge-identification stage, its computational cost is not included. For simplicity, in the cost estimates, the costs of all operations (e.g., multiplication, addition, etc.) are regarded as equal.

The SRC operations per pixel include the 2MR ratios required to form the matrix $K_{AB}(u)(i, j)$ in equation (4), plus the 4MR computations required to form $\Delta(K_{AB}(u))(i, j)$ in equation (6), plus the MR operations required to define the edges in equation (8). The total number of operations for the SRC algorithm is 7MR operations per pixel. The ASRC computations include those from the SRC algorithm (7MR operations per pixel) plus those required computing and utilizing the parameters $\gamma_{m,r}^{i,j}$. To calculate these parameters, the classification and label comparison of the pixels within the mask is first made, a task that will cost 2M+6R operations per pixel. Next, the computation of the $\gamma_{m,r}^{i,j}$ parameter requires 11MR operations per pixel (two XOR operations and one OR operation for each entry in equation (6)). The total number of operations for the ASRC algorithm is therefore 2M+6R+18MR operations per pixel.

Meanwhile, the MCG algorithm requires 10K-3 operations to compute the first fundamental form for each hyper-pixel, nine operations to compute the corresponding eigenvalues, and three operations to compute the monitor function and apply the threshold. The total number of operations for the MCG algorithm is therefore 10K+9 operations per pixel. Next, for each hyper-pixel, the HySPADE algorithm requires the computation of IJ spectral angles (each spectral angle costs 6K+1 operations), plus the 2IJ+1 operations per pixel of the SA-cube to compute the one-dimensional derivative approximation, plus the IJ+1 operations required to account for the statistical accumulation of each pixel within the SA-cube. The total number of operations for the HySPADE algorithm is therefore IJ(3IJ+6K+3) operations per pixel.

In Table V, a summary of the estimated values for the four algorithms is presented considering the same AHI and DWELL experiments previously discussed in Section II. The SRC and ASRC algorithms, taught herein, do not change their respective computational costs for the two examples, because the edge signature identification removes the dependency of the algorithms on the actual number of bands of the data. From Table 5, it can be observed that the SRC algorithm gives a 71-fold gain in computational efficiency over the MCG algorithm for the two-class edge detection problem over the AHI data, whereas the ASRC algorithm gives a 23-fold gain.

TABLE V

COMPARISON TABLE FOR THE TOTAL NUMBER OF OPERATIONS REQUIRED FOR THE SRC, ASRC, MCG AND HYSPADE ALGORITHMS

| | | Total number of operations per pixel | |
|---|---|---|---|
| | | Examples (M = 4 and R = P9 1) | |
| Algorithm | General expression | AHI data (K = 200) | DWELL data (K = 10) |
| SRC | 7MR | 28 | 28 |
| ASRC | 2M + 6R + 18MR | 86 | 86 |
| MCG | 10K + 9 | 2,009 | 109 |
| HySPADE | IJ(3IJ + 6K + 3) | >$10^9$ | >$10^{10}$ |

IV. Discussion

The model-based, spatio-spectral edge-detection algorithm, termed the SRC algorithm enables the detection of edges that are due to either material change or intensity variation in scenes containing a prescribed set of materials. The model-based, spatio-spectral edge-detection algorithm, termed the ASRC algorithm is a specialized version of the SRC algorithm, aimed at detecting edges that are due to a change in the material only. The ASRC aims to reduce the detection of false edges due to unwanted changes in the intensity.

Both algorithms can utilize spectral library information to construct a sparse, non-separable and 3D edge operator, while exploiting spectral ratio contrast. The reported SRC edge detector performs as well as the MCG edge detector for moderately challenging edges, requiring fewer operations than that required by the MCG algorithm (a reduction by a factor of 71 in examples discussed herein). However, for challenging imagery containing isoluminant edges, the SRC and ASRC edge detectors outperform the MCG and HySPADE edge detectors by a wide margin, as quantified by the detection and false-alarm probabilities. This provides a strong validation of the efficacy of the spectral ratio contrast technique by showing that the use of select band ratios can lead to reliable identification of weak edges in the presence of noise. Moreover, with a slight increase in the complexity (3 folds in examples discussed herein), the ASRC algorithm, which also involves classification-based step, is capable of minimizing the false-alarm edges, outperforming the SRC, MCG, and HySPADE algorithms.

The dramatic reduction in the number of operations with respect to other algorithms such as the MCG and the HySPADE algorithms provides a key enhancement by the processing techniques taught herein. The reduced number of operations is mainly due to the property that only a few bands are required to perform edge detection. In principle, this property can be exploited to reduce the spectral-image acquisition time substantially by requiring the sensing of only those bands that are most relevant to the set of materials within the scene. In particular, this band-reduction feature is particularly relevant to emerging spectral imaging sensors that are bias tunable, such as the DWELL sensor, where one can perform intelligent acquisition by programming the sensor electronically to sense only at the few prescribed bands.

The two model-based algorithms, SRC and ASRC, for edge detection in spectral imagery can be specifically targeted to capture intrinsic features such as isoluminant edges that are characterized by a jump in color but not in intensity.

Given prior knowledge of the classes of reflectance or emittance spectra associated with candidate objects in a scene, a small set of spectral-band ratios, which most profoundly identify the edge between each pair of materials, are selected to define an edge signature. The bands that form the edge signature are fed into a spatial mask, producing a sparse joint spatio-spectral nonlinear operator. The SRC algorithm achieves edge detection for every material pair by matching the response of the operator at every pixel with the edge signature for the pair of materials. The ASRC algorithm is a classifier-enhanced extension of the SRC algorithm that adaptively accentuates distinctive features before applying the spatio-spectral operator. Both algorithms were extensively verified using spectral imagery from the AHI and from a DWELL mid-IR imager. In both cases the MCG and the HySPADE edge detectors were used as a benchmark for comparison. The results demonstrate that the SRC and ASRC algorithms outperform the MCG and HySPADE edge detectors in accuracy, especially when isoluminant edges are present. By using only a few bands as input to the spatio-spectral operator, the SRC and ASRC algorithms enable significant levels of data compression in band selection.

Although specific embodiments have been illustrated and described herein, it will be appreciated by those of ordinary skill in the art that any arrangement that is calculated to achieve the same purpose may be substituted for the specific embodiments shown. Upon studying the disclosure, it will be apparent to those skilled in the art that various modifications and variations can be made in the devices and methods of various embodiments of the invention. Various embodiments can use permutations and/or combinations of embodiments described herein. Other embodiments will be apparent to those skilled in the art from consideration of the specification and practice of the embodiments disclosed herein. It is to be understood that the above description is intended to be illustrative, and not restrictive, and that the phraseology or terminology employed herein is for the purpose of description.

What is claimed is:

1. A method comprising:
acquiring data of an image;
processing the data including identifying a candidate location of an edge between two materials in the image, the data having neighboring pixels defining a portion of the candidate location, wherein processing the data including identifying the candidate location of an edge includes defining an edge signature between the two materials using a ratio of spectral bands that maximize spectral contrast between the two materials in the data of the image;
applying a classifier to the neighboring pixels to determine, based on material changes, if the neighboring pixels are correlated to two different materials with respect to the candidate location, providing a modifier for a spatio-spectral mask;
applying the spatio-spectral mask using the modifier to accept or reject the candidate location as an edge; and
generating an image to a device, the candidate location in the image correlated to the application of the spatio-spectral mask using the modifier, wherein applying the spatio-spectral mask using the modifier includes using the modifier in an indicator matrix, each element of the indicator matrix correlated to a comparison of a difference of the spatio-spectral mask and the edge signature for a respective neighborhood of the candidate location with respect to a product of a respective modifier and a tolerance parameter.

2. The method of claim 1, wherein applying the spatio-spectral mask using the modifier includes modifying an edge-detection threshold, the edge-detection threshold being a threshold according to which an edge is declared.

3. The method of claim 2, wherein modifying the edge-detection threshold includes adaptive modification.

4. The method of claim 1, wherein the method includes:
generating classification information for pixels surrounding each candidate location for the edge by applying the classifier to the pixels surrounding each candidate location; and
modifying edge-detection thresholds using the classification information for the surrounding pixels, the edge-detection thresholds being thresholds according to which edges are declared.

5. The method of claim 1, wherein applying the classifier to the neighboring pixels includes adaptively pre-qualifying spectral ratios of the spatio-spectral mask to capture the edge due solely to material changes.

6. The method of claim 1, wherein the respective modifier is a numerical value one if the two materials are determined to be different and a numerical value zero if the two materials are determined to be the same.

7. The method of claim 1, wherein the spatio-spectral mask is non-separable into spectral and spatial components.

8. A method comprising:
acquiring data of an image;
processing the data including identifying a candidate location of an edge between two materials in the image, the data having neighboring pixels defining a portion of the candidate location;
applying a classifier to the neighboring pixels to determine, based on material changes, if the neighboring pixels are correlated to two different materials with respect to the candidate location, providing a modifier for a spatio-spectral mask;
applying the spatio-spectral mask using the modifier to accept or reject the candidate locations as an edge; and
generating an image to a device, the candidate location in the image correlated to the application of the spatio-spectral mask using the modifier, wherein the method includes:
identifying a plurality of candidate locations of a plurality of edges of a plurality of materials by defining a plurality of edge signatures between the plurality of materials on a pairwise basis using a ratio of spectral bands that maximize spectral contrast between the materials of each pair;
defining a plurality of spatio-spectral masks equal in number to the number of edge signatures; and
applying the classifier to neighboring pixels of each candidate location.

9. A non-transitory machine-readable storage device having instructions stored thereon, which when executed by a processor, cause a machine to perform operations comprising:
acquiring data of an image;
processing the data including identifying a candidate location of an edge between two materials in the image, the data having neighboring pixels defining a portion of the candidate location, wherein processing the data including identifying the candidate location of an edge includes defining an edge signature between the two materials using a ratio of spectral bands that maximize spectral contrast between the two materials in the data of the image;

applying a classifier to the neighboring pixels to determine, based on material changes, if the neighboring pixels are correlated to two different materials with respect to the candidate location, providing a modifier for a spatio-spectral mask;

applying the spatio-spectral mask using the modifier to accept or reject the candidate location as an edge; and generating an image to a device, the candidate location in the image correlated to the application of the spatio-spectral mask using the modifier, wherein applying the spatio-spectral mask using the modifier includes using the modifier in an indicator matrix, each element of the indicator matrix correlated to a comparison of a difference of the spatio-spectral mask and the edge signature for a respective neighborhood of the candidate location with respect to a product of a respective modifier and a tolerance parameter.

10. The non-transitory machine-readable storage device of claim 9, wherein applying the spatio-spectral mask using the modifier includes modifying an edge-detection threshold, the edge-detection threshold being a threshold according to which an edge is declared.

11. The non-transitory machine-readable storage device of claim 10, wherein modifying the edge-detection threshold includes adaptive modification.

12. The non-transitory machine-readable storage device of claim 9, wherein the operations include:

generating classification information for pixels surrounding each candidate location for the edge by applying the classifier to the pixels surrounding each candidate location; and modifying edge-detection thresholds using the classification information for the surrounding pixels, the edge-detection thresholds being thresholds according to which edges are declared.

13. The non-transitory machine-readable storage device of claim 9, wherein applying the classifier to the neighboring pixels includes adaptively pre-qualifying spectral ratios of the spatio-spectral mask to capture the edge due solely to material changes.

14. The non-transitory machine-readable storage device of claim 9, wherein the respective modifier is a one if the two materials are determined to be different and a zero if the two materials are determined to be the same.

15. The non-transitory machine-readable storage device of claim 9, wherein the spatio-spectral mask is non-separable into spectral and spatial components.

16. A non-transitory machine-readable storage device having instructions stored thereon, which when executed by a processor, cause a machine to perform operations comprising:

acquiring data of an image;

processing the data including identifying a candidate location of an edge between two materials in the image, the data having neighboring pixels defining a portion of the candidate location;

applying a classifier to the neighboring pixels to determine, based on material changes, if the neighboring pixels are correlated to two different materials with respect to the candidate location, providing a modifier for a spatio-spectral mask;

applying the spatio-spectral mask using the modifier to accept or reject the candidate location as an edge; and generating an image to a device, the candidate location in the image correlated to the application of the spatio-spectral mask using the modifier, wherein the operations include:

identifying a plurality of candidate locations of a plurality of edges of a plurality of materials by defining a plurality of edge signatures between the plurality of materials on a pairwise basis using a ratio of spectral bands that maximize spectral contrast between the materials of each pair;

defining a plurality of spatio-spectral masks equal in number to the number of edge signatures; and applying the classifier to neighboring pixels of each candidate location.

17. A system comprising:

an interface to receive data of image; and a processor operatively coupled to acquire the data received at the interface, the processor arranged to:

process the data including identification of a candidate location of an edge between two materials in the image, the data having neighboring pixels defining a portion of the candidate location, wherein the processor arranged to process the data including identification of the candidate location includes the processor arranged to define an edge signature between the two materials using a ratio of spectral bands that maximize spectral contrast between the two materials in the data of the image;

apply a classifier to the neighboring pixels to determine, based on material changes, if the neighboring pixels are correlated to two different materials with respect to the candidate location, providing a modifier for a spatio-spectral mask;

apply the spatio-spectral mask using the modifier to accept or reject the candidate location as an edge; and generate an image to a device, the candidate location in the image correlated to a result of the application of the spatio-spectral mask using the modifier, wherein application of the spatio-spectral mask using the modifier includes use of the modifier in an indicator matrix, each element of the indicator matrix correlated to a comparison of a difference of the spatio-spectral mask and the edge signature for a respective neighborhood of the candidate location with respect to a product of a respective modifier and a tolerance parameter.

18. The system of claim 17, wherein application of the spatio-spectral mask using the modifier includes modification of an edge-detection threshold, the edge-detection threshold being a threshold according to which an edge is declared.

19. The system of claim 17, wherein the processor is arranged to:

generate classification information for pixels surrounding each candidate location for the edge by applying the classifier to the pixels surrounding each candidate location; and modify edge-detection thresholds using the classification information for the surrounding pixels, the edge-detection thresholds being thresholds according to which edges are declared.

20. The system of claim 17, wherein application of the classifier to the neighboring pixels includes an adaptive pre-qualification of spectral ratios of the spatio-spectral mask to capture the edge due solely to material changes.

21. The system of claim 17, wherein the respective modifier is a one if the two materials are determined to be different and a zero if the two materials are determined to be the same.

22. The system of claim 17, wherein the spatio-spectral mask is non-separable into spectral and spatial components.

23. A system comprising:
- an interface to receive data of image; and
- a processor operatively coupled to acquire the data received at the interface, the processor arranged to:
  - process the data including identification of a candidate location of an edge between two materials in the image, the data having neighboring pixels defining a portion of the candidate location;
  - apply a classifier to the neighboring pixels to determine, based on material changes, if the neighboring pixels are correlated to two different materials with respect to the candidate location, providing a modifier for a spatio-spectral mask;
  - apply the spatio-spectral mask using the modifier to accept or reject the candidate location as an edge; and
  - generate an image to a device, the candidate location in the image correlated to a result of the application of the spatio-spectral mask using the modifier, wherein the processor is arranged to:
    - identify a plurality of candidate locations of a plurality of edges of a plurality of materials by defining a plurality of edge signatures between the plurality of materials on a pairwise basis by use of ratios of spectral bands that maximize spectral contrast between the materials of each pair;
    - define a plurality of spatio-spectral masks equal in number to the number of edge signatures; and
    - apply the classifier to neighboring pixels of each candidate location.

24. The system of claim 17, wherein the device includes a display, a printer, or a memory.

25. The system of claim 17, wherein the system includes a sensor to generate the data of the image.

26. The system of claim 25, wherein the sensor includes a quantum dots-in-a-well (DWELL) mid-infrared (IR) imager.

27. The system of claim 25, wherein the sensor includes a spectral imager.

28. The system of claim 27, wherein the spectral imager is spectrally tunable.

29. The system of claim 28, wherein the spectrally tunable imager includes one or more of an electrical tuning mechanism or an optical mechanism.

* * * * *